No. 736,411. PATENTED AUG. 18, 1903.
G. I. LEONARD.
METHOD OF LOCATING MINERALS.
APPLICATION FILED MAY 22, 1902.
NO MODEL.
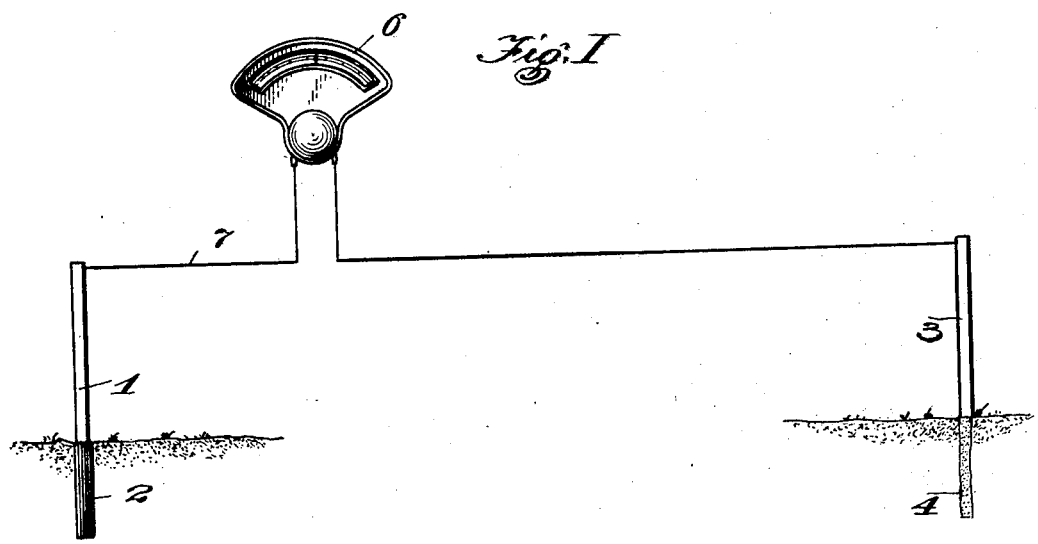
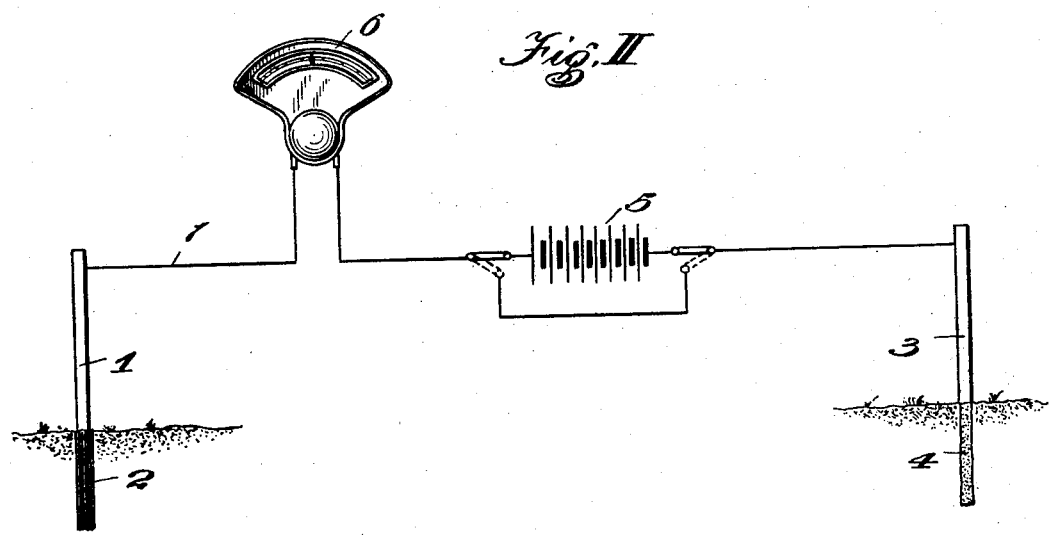
Witnesses
Inventor
George I. Leonard
by Townsend Bro.
his atty No. 736,411.

Patented August 18, 1903.

UNITED STATES PATENT OFFICE.

GEORGE I. LEONARD, OF PASADENA, CALIFORNIA, ASSIGNOR OF TWO-THIRDS TO JOHN McL. ARMSTRONG, OF LONGBEACH, CALIFORNIA, AND ERTELL W. LINCOLN, OF PASADENA, CALIFORNIA.

METHOD OF LOCATING MINERALS.

SPECIFICATION forming part of Letters Patent No. 736,411, dated August 18, 1903.

Application filed May 22, 1902. Serial No. 108,602. (No model.)

*To all whom it may concern:*

Be it known that I, GEORGE I. LEONARD, a citizen of the United States, residing at Pasadena, in the county of Los Angeles and State of California, have invented a new and useful Method for Locating Minerals, of which the following is a specification.

My invention relates to a method for determining the location of minerals in the earth, and particularly to a novel and useful method for generating an electric current in the earth and measuring the resistance of the circuit.

One object of my invention is to provide a method in which a direct current may be used and the gases of electrolysis avoided.

Another object is to provide a method whereby the resistance of certain portions of the earth may be determined with greater accuracy than by any other process of similar character of which I am aware.

Another object is to provide a method in which the electric current may be generated in the earth.

In carrying out my method I preferably place electrodes of dissimilar metals apart in the earth, saturate a portion of earth surrounding each electrode with a solution of salts of the metal of which the adjacent electrode is composed which produces an electric current through the earth between the two electrodes, and then measure the resistance of the circuit.

Figure I illustrates an arrangement of apparatus for carrying out my method. Fig. II illustrates the same with a slight modification.

1 is a cathode, preferably of copper, which may be placed in the earth. A solution of sulfate of copper, represented by the shaded portion 2, saturates the adjacent earth and surrounds the buried portion of the cathode in the manner of a film.

3 is an anode, preferably of iron, which may be placed in the earth at a suitable distance from the cathode 1. The buried portion of the anode 3 is surrounded by a solution of sulfate of iron, (indicated by the dotted portion 4,) which also saturates the adjacent portion of earth. A wire 7 may connect the anode and cathode with a meter 6.

In operation the anode 3 and cathode 1 are driven into the earth at a distance apart. The anode 3 may then be withdrawn from the earth and a solution of sulfate of iron poured into the hole made by the anode. The anode may then again be placed in the hole, which will cause the solution to form around the buried portion of the anode in the manner of a film. The cathode may likewise be withdrawn from the earth and a solution of sulfate of copper poured into the hole and the cathode again placed in the earth, which causes the solution to surround the cathode in the manner of a film. The portion of the circuit comprising the electrodes, wire, and meter has a definite resistance, while the portion of earth lying between the anode and cathode forms a part of the circuit the resistance of which is to be determined. The resistance in the circuit may be indicated by the meter, and if the portion of earth which forms part of the circuit contains minerals the resistance indicated is relatively low, while if the portion of earth contains no appreciable amount of mineral the resistance indicated is relatively high.

By changing the positions of the anode and cathode and keeping a record of the resistance at each trial a map may be made of the locality embraced in the operations and the location of the mineral accurately determined.

The difficulty of taking measurements heretofore by using the direct current is avoided in my method by the solutions surrounding the anode and the cathode, which largely prevent the formation of the gases of electrolysis.

The anode 3 and cathode 1 when placed in portions of the earth, which portions are saturated with the respective solutions, form the poles of a battery, and the chemical action that takes place is similar to that of a Daniell battery—*i. e.*, a metal being deposited from the surrounding solution on one pole, as at the cathode 1, and the metal of the other pole, as the anode 3, being attacked by the solution with the formation of a salt of that metal. The earth between the electrodes corresponds to the porous cup of the Daniell cell.

If desired, a battery 5 may be connected in series in the circuit to increase the current to allow the use of a less sensitive meter or other device.

While I have stated that the electrodes may be of copper and iron, respectively, other metals might be substituted therefor. For instance, zinc might be substituted for the iron; but I prefer to use iron on account of its strength and stiffness. Likewise solutions other than those mentioned might be found to accomplish the same purpose.

Other means than the meter shown may be used for determining the resistance.

The size and proportions of the material used may be varied considerably without impairing the efficiency of the method; but I have found in practice that the electrodes may preferably be about a half-inch in diameter. The amount of each solution required to give a sufficient saturation of earth at each trial is about a gill. The electrodes may be driven into the earth for a distance of two feet.

The system of procedure in taking the measurements may be determined by the operator according to the conditions present in the locality embraced in the operations.

What I claim, and desire to secure by Letters Patent of the United States, is—

1. The method of locating minerals consisting of placing electrodes of different conducting materials in portions of the earth saturated with liquid which acts more upon one electrode than the other, connecting the electrodes by a conductor insulated from the earth, and measuring the resistance of the circuit.

2. The method of locating minerals consisting of saturating one portion of earth with one liquid, placing an electrode in said saturated portion which is acted upon by that liquid, saturating another portion of earth with another liquid, placing another electrode in the latter saturated portion which is acted upon by the latter liquid, connecting said electrodes with a conductor insulated from the earth, and measuring the resistance of the circuit.

3. The method of locating minerals consisting of placing electrodes of different conducting materials in portions of earth saturated with liquid which acts more upon one electrode than the other, connecting the electrodes by a conductor insulated from the earth, increasing the current thus produced by additional means, and measuring the resistance of the circuit.

4. The method of locating minerals consisting of placing electrodes of dissimilar metals at separate parts in the earth, connecting the electrodes with a conductor insulated from the earth, causing a deposit of salts of one metal on one electrode, causing the formation of salts from the other electrode, thus causing an electric current to flow through the circuit formed, and measuring the resistance of the circuit.

5. The method of locating minerals consisting of placing a copper cathode and an iron anode in the earth at distances apart, connecting the anode and cathode by a conductor insulated from the earth, causing a deposit of metal on the cathode, causing the formation of salts from the anode, passing an electric current through the circuit formed and measuring the resistance of the circuit.

6. The method of locating minerals consisting of placing an anode and a cathode in the earth at a distance apart, connecting the anode and cathode by a conductor insulated from the earth, causing a metallic deposit on the cathode and causing the formation of a salt from the anode, causing an electric current to flow through the circuit formed and measuring the resistance of the circuit.

7. The method of locating minerals consisting of placing a copper cathode and an iron anode in the earth at distances apart, connecting the anode and the cathode by a conductor insulated from the earth, saturating a portion of earth adjacent the cathode with a solution of sulfate of copper, saturating a portion of earth adjacent the anode with a solution of sulfate of iron thereby producing an electric current through the circuit formed, and measuring the resistance of the circuit.

8. The method of locating minerals consisting of placing an electrode in a portion of earth saturated with a solution of salts of a metal of which the electrode is composed, placing an electrode of a different metal in another portion of earth saturated with a solution of salts of a metal of which the latter electrode is composed, connecting said electrodes by a conductor insulated from the earth, measuring the resistance in the circuit formed, changing the positions of the electrodes and solutions and measuring the resistance of the new circuit, and comparing the resistances of the different circuits.

9. The method of determining electrical resistance of a portion of the earth which consists in forming a two-fluid voltaic battery with the earth as its porous cell the poles being at a distance apart, and then measuring the electrical resistance of the earth between said poles.

10. The method of generating an electric current in the earth for the purpose of locating mineral which consists of inserting electrodes at different points in the earth, saturating the earth adjacent one electrode with a liquid, saturating the earth adjacent the other electrode with a liquid which acts more upon that electrode than the liquid acts on the first-mentioned electrode, and connecting the electrodes with a measuring device insulated from the earth.

11. The method of generating an electric current in the earth for the purpose of locating mineral which consists of inserting electrodes of different conducting materials at different points in the earth, saturating the earth adjacent one electrode with a liquid, saturating the earth adjacent the other electrode with a liquid which acts more upon that electrode than the liquid acts on the first-mentioned electrode, and connecting the electrode with a measuring device insulated from the earth, and increasing the current thus produced by additional means.

In witness whereof I have signed my name to this specification, in the presence of two subscribing witnesses, at Los Angeles, in the county of Los Angeles and State of California, this 15th day of May, 1902.

GEORGE I. LEONARD.

Witnesses:
G. T. HACKLEY,
E. W. LINCOLN.